United States Patent [19]

Timm et al.

[11] 4,237,623

[45] Dec. 9, 1980

[54] HUMIDIFIED HOLDING CABINET FOR FOODS

[75] Inventors: Malvern K. Timm, Troy; James D. King, Dayton; David O. Moore, Eaton, all of Ohio

[73] Assignee: Henny Penny Corporation, Eaton, Ohio

[21] Appl. No.: 82,415

[22] Filed: Oct. 5, 1979

[51] Int. Cl.³ .............................................. F26B 9/06
[52] U.S. Cl. ...................................... 34/196; 34/198; 261/119 R; 261/141
[58] Field of Search ................. 34/195, 196, 198, 219; 261/119 R, 141; 55/226

[56] References Cited

U.S. PATENT DOCUMENTS

| | | | |
|---|---|---|---|
| 1,925,210 | 9/1933 | Smith | 34/198 |
| 1,977,905 | 10/1934 | Bohmker | 261/119 R |
| 2,318,027 | 5/1943 | Sykes et al. | 34/196 |
| 2,574,950 | 11/1951 | Ben-Dor | 126/369 |

Primary Examiner—Larry I. Schwartz

[57] ABSTRACT

A food holding cabinet having a closed loop air circulating system to control both heat and humidity, the system including a blower having an air inlet at the front-top-center of the interior of the cabinet, the outlet of the blower being connected to an elongated heating tube the discharge end of which directs heated air over a water reservoir containing a plurality of upwardly projecting removable heat transfer plates. The quantity of moisture introduced into the flowing air is controlled by varying the number of heat transfer plates. The heated and humidified air flows downwardly through a duct at the rear of the cabinet, the duct having rows of perforations aligned with the undersides of product containing trays or baskets in the cabinet, the air being drawn through the cabinet for return to the blower inlet. Heat is controlled by a temperature controller having a probe mounted in the inlet to the blower.

14 Claims, 3 Drawing Figures

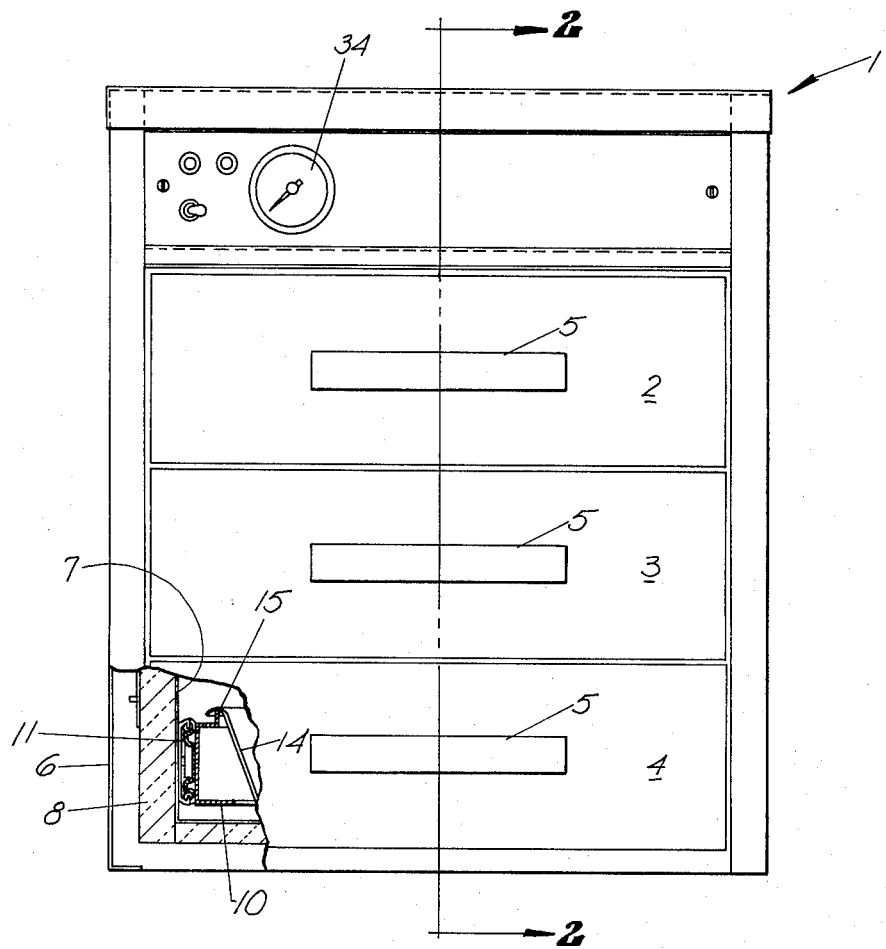

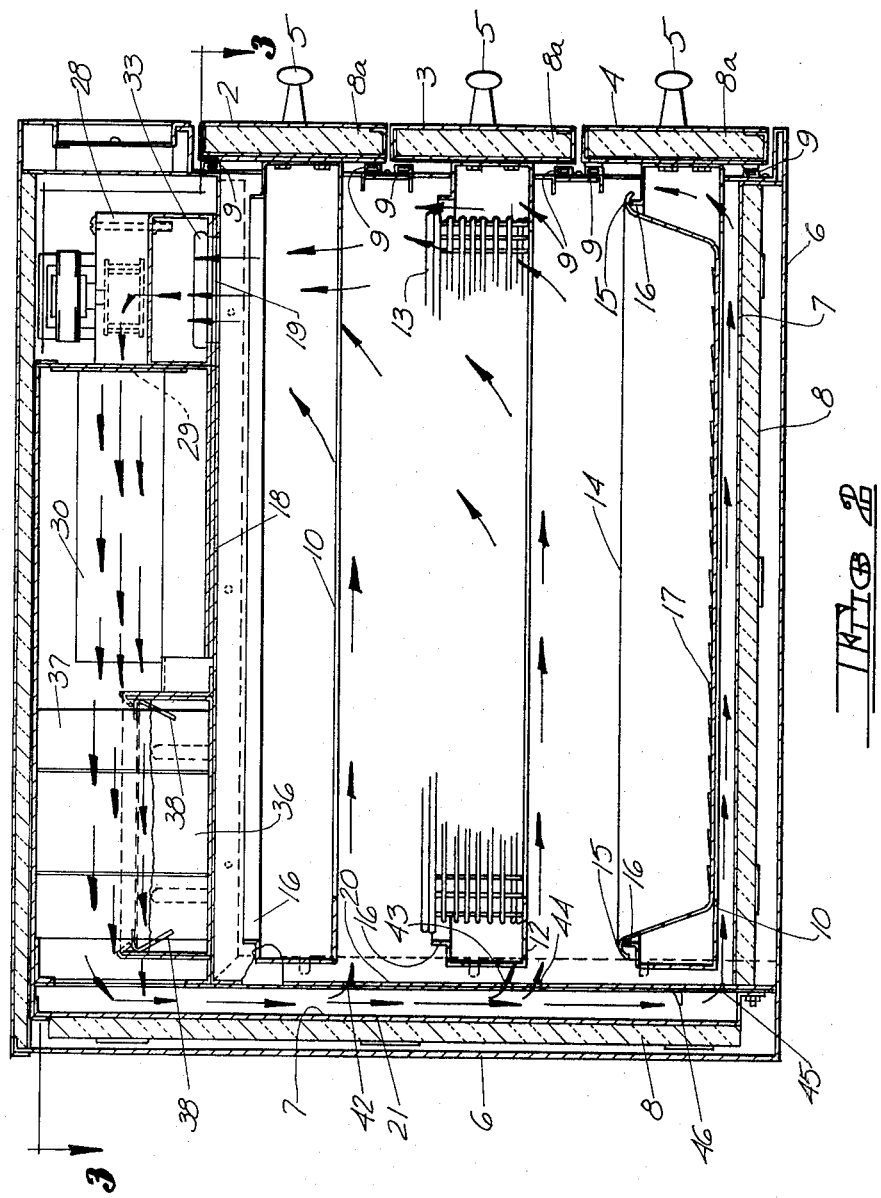

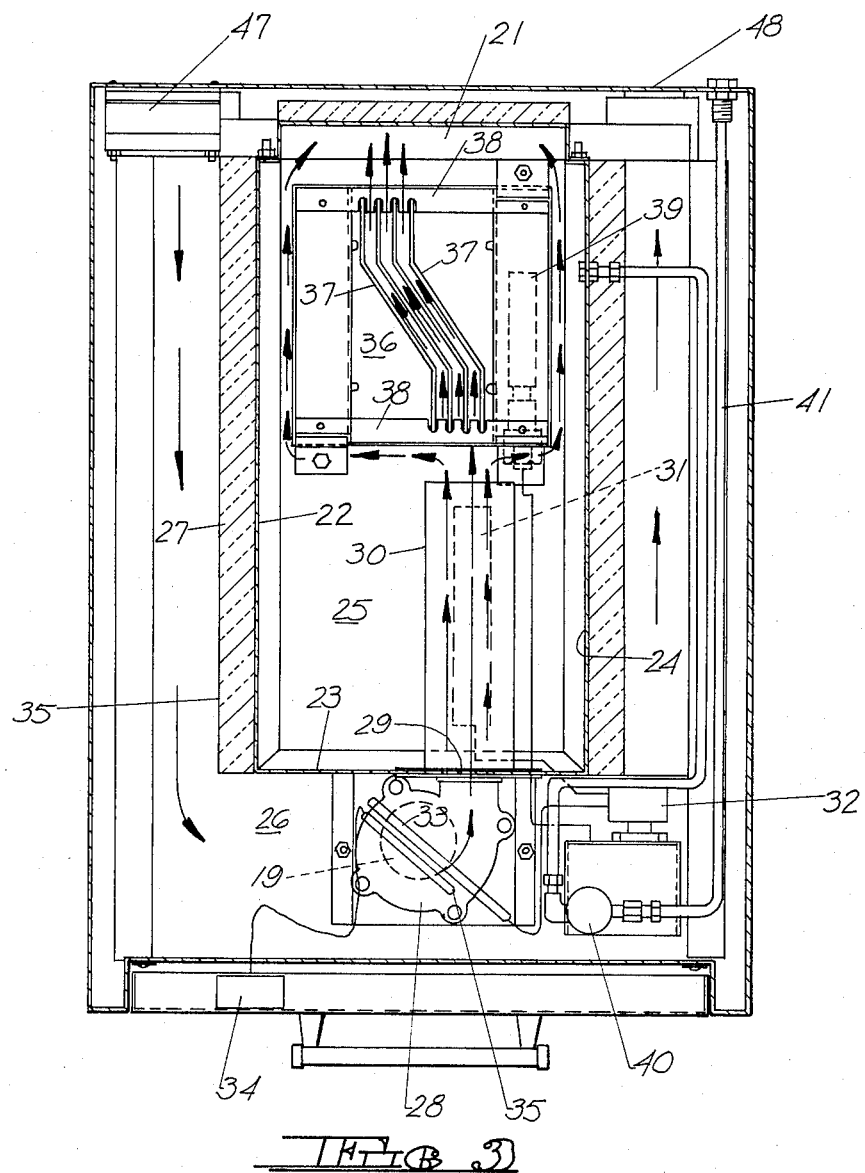

HUMIDIFIED HOLDING CABINET FOR FOODS

This invention relates to food holding cabinets, and has to do more particularly with cabinets capable of holding prepared foods under uniform and essentially constant moisture and temperature conditions for extended periods of time.

BACKGROUND OF THE INVENTION

In the fast-food industry, food products, such as fried chicken, are normally prepared in large quantities, and subsequent to preparation the cooked product is held in heated condition so that it may be dispensed to customers as the demand requires. Various types of holding cabinets have hitherto been proposed for such purpose, but in large measure they have been unsatisfactory for a number of reasons. If heat alone is employed to maintain the food product at the desired temperature for serving, the product will rapidly lose moisture and dry out. In addition, unless the movement of air within the holding cabinet is carefully controlled, temperature variations will exist in different parts of the cabinet resulting in non-uniformly heated products.

Various expedients have also been proposed to control both temperature and moisture within the holding cabinet, but again problems have been experienced in maintaining the humidity at the desired uniform level throughout the confines of the cabinet. The problem is magnified by the fact that the cabinet must be repeatedly opened and closed to permit the products to be removed as needed, thereby permitting outside air to enter the cabinet. Unless this outside air can be rapidly assimilated, it will adversely affect the uniformity of both temperature and moisture within the cabinet.

The present invention overcomes the difficulties encountered with known holding cabinets by providing a unique construction and arrangement of parts which insures accurate control as well as uniformity of both temperature and humidity throughout the cabinet.

BRIEF SUMMARY OF THE INVENTION

A holding cabinet in accordance with the invention is preferably of the countertop type having a plurality of drawers forming pans or baskets, usually three in number, adapted to be filled with product, the drawers being selectively openable to remove desired quantities of the product. When the drawers are closed, the cabinet is effectively sealed and only the air within the cabinet is circulated.

The heating and humidifying system is at the top of the cabinet, the system comprising a blower having an air inlet at the front-top-center of the cabinet interior, the blower outlet communicating with an elongated heating tube containing a heating element, the heated air discharged from the opposite end of the heating tube being blown over a water reservoir containing a plurality of removable heat transfer plates, whereupon the air then passes downwardly through a full width duct defining the inner rear wall of the cabinet.

Perforations are provided in the duct at spaced intervals to permit the heated air to flow into the interior of the cabinet, the perforations being arranged to direct the air into the cabinet adjacent the undersurface of each product containing drawer. The air thus flows forwardly through the cabinet as well as through the drawers, which may comprise wire-like baskets or perforated pans, the air being drawn to the inlet side of the blower for recirculation.

The temperature of the air within the cabinet is controlled by a temperature controller having a probe mounted in the air inlet to the blower. The temperature controller acts to energize and deenergize the heating element in the heating tube, the controller preferably being preset to establish a desired temperature within the cabinet.

An important feature of the invention lies in the water reservoir and heat transfer plate arrangement. A plurality of non-linear plates are removably seated in the reservoir, the plates projecting upwardly from the reservoir so as to lie in the path of the heated air expelled from the heating tube. Preferably the plates will be formed of aluminum which will be heated as the heated air flows around the plates, the heated plates thus serving to heat the water in the reservoir, thereby releasing moisture into the air stream. By varying the number of plates in the reservoir, the humidity within the cabinet can be controlled, i.e., removing one or more of the plates will incrementally decrease the humidity, whereas adding one or more plates will incrementally increase the humidity. The water reservoir contains a float valve to automatically maintain the water at a predetermined level.

The cabinet is also provided with conventional controls, including a thermometer to give a visual indication of cabinet temperature, and it is also preferred to provide a separate ventilating system for the blower and the controls, thereby assuring that they will not overheat.

BRIEF DESCRIPTION OF THE DRAWINGS

FIG. 1 is a front elevational view, with parts broken away, of an exemplary three drawer counter top holding cabinet in accordance with the invention.

FIG. 2 is a vertical sectional view taken along the line 2—2 of FIG. 1, the view also illustrating various drawer constructions which may be utilized.

FIG. 3 is a horizontal sectional view taken along the irregular line 3—3 of FIG. 2

DETAILED DESCRIPTION

Referring first to FIG. 1 wherein the holding cabinet is indicated generally by the reference numeral 1, the cabinet has drawers 2, 3 and 4, each having a handle 5 by means of which the drawers may be opened and closed. The exact construction of the cabinet does not constitute a limitation on the invention, although preferably it will have an outer shell 6 and an inner shell 7 (also seen in FIG. 2) in spaced relation, the inner shell in part defining the interior of the holding cabinet, suitable insulation 8 being interposed between the inner and outer shells in the manner illustrated. Insulation, indicated at 8a, also may be provided for the front panels of the drawers. When closed, the front panels of the drawers are adapted to seat against gaskets 9 surrounding the drawer openings, so that the interior of the cabinet is effectively sealed when the drawers are closed, thereby providing a closed loop circulation system. It has been found that closer control of temperature and humidity can be achieved with a closed system. If fresh air is continuously drawn into the system, it becomes far more difficult to overcome the effects of fresh air which enters the cabinet when the drawers are opened.

Each drawer has a generally rectangular supporting frame 10 the opposite sides of which mount drawer suspension members 11 of the telescoping type which permit the drawers to be fully extended. The supporting frames have horizontally disposed peripheral bottom flanges 12 on which a wire basket 13 (seen in FIG. 2) may be seated, the basket serving as a receptacle for the product being stored. Alternatively, the supporting frames may be utilized to receive pans 14, seen in FIGS. 1 and 2, the pans having rolled upper edges 15 adapted to seat on the upstanding peripheral top flanges 16 forming integral parts of the supporting frames. If desired, the bottoms of the pans 14 may be perforated or louvered, as indicated at 17, to implement air circulation. The user thus has a choice of the type of receptacle in which the product will be stored, and the receptacles are readily removable for cleaning.

The heating and humidifying system is contained in a separate compartment at the top of the cabinet, being separated from the interior of the cabinet by a dividing wall 18 seen in FIG. 2. The wall 18 has a centrally disposed inlet orifice 19 adjacent its front side edge, and its rear side edge terminates short of the rear wall of the inner shell, where it coincides with the upper edge of a vertically disposed partition 20 which coacts with the rear wall of the inner shell 6 to define an air passageway or duct 21.

As seen in FIG. 3, the upper compartment is divided by walls 22, 23 and 24 into a rectangular inner chamber 25 and a U-shaped outer chamber 26. Insulation 27 is provided between the chambers. A blower unit 28 is mounted in outer chamber 26 with its inlet side in communication with the inlet orifice 19 and its outlet side in communication with an outlet orifice 29 in the wall 23 between the inner and outer chambers.

The outlet orifice 29 communicates with an elongated heating tube 30 mounted in inner chamber 25, the heating tube surrounding a conventional resistance heating element, indicated at 31, the heating element being operatively connected to a thermostatic controller 32. A temperature probe 33 for the thermostatic controller 32 is mounted between air inlet orifice 19 and the blower unit 28. The thermostatic controller 32 preferably will be preset to the desired temperature and will energize and deenergize the heating element 31 in accordance with air temperature as sensed by the probe 33. While it is preferred to preset the thermostatic controller 32 to the desired temperature at which a particular product is to be held, it will be understood that the thermostatic controller may be provided with a suitable adjustment knob for manual adjustment by persons using the cabinet, although a preset controller is preferred to prevent arbitrary adjustments which may provide less than optimum operating conditions. In addition to the thermostatic controller, a conventional gauge type thermometer 34 may be provided on the front of the cabinet to indicate cabinet temperature, the thermometer 34 having a probe 35 lying adjacent to the probe 33.

A water reservoir 36 is mounted in inner chamber 25 beyond the discharge end of heating tube 30, the reservoir containing a series of removable heat transfer plates 37, the plates being aligned in spaced apart relation by means of slotted brackets 38 at the opposite ends of the reservoir. The plates 37 are vertically disposed and of a height to extend from the bottom of the reservoir to substantially the top of the chamber 25 so that substantial portions of the plates will be exposed to the heated air discharged from the heating tube 30. The plates are preferably bent and reversely bent so as to be of non-linear configuration, thereby increasing their effective areas of exposure to the flow of heated air and also to the water in the reservoir.

As the heated air flows around the transfer plates, which are preferably formed from aluminum of approximately 3.175 m.m. thickness, the plates are heated and the heat conducted into the water in the reservoir, the heated water releasing moisture into the air stream. It has been found that by varying the number of heat transfer plates the humidity level within the cabinet can be adjusted as desired. In an exemplary installation, the removal of one plate will reduce the humidity level by about 5%. There is an interrelationship between humidity and temperature; in general, for a given temperature a specific humidity is obtained. By varying the temperature and/or adding or removing heat transfer plates, optimum operating conditions for a given product can be readily established.

A float switch 39 is provided in reservoir 36 to control the water level, the float switch being connected to a solenoid valve 40 which controls the flow of water through water supply pipe 41.

The heated and humidified air flows rearwardly and downwardly into duct 21 from which the air is introduced into the interior of the cabinet through spaced apart rows of perforations in duct forming partition 20. A first row of perforations 42 underlies the rear bottom edge of uppermost drawer 2, second and third rows of perforations 43 and 44 lie adjacent the rear bottom edge of middle drawer 3, and a fourth row of perforations lies adjacent the rear bottom edge of lowermost drawer 4. Such arrangement provides circulation throughout the interior of the cabinet, the air flowing between and around the drawer units as well as through the product containing baskets or louvered trays. The air flows in a closed loop being drawn toward the inlet orifice 19 for recirculation. To the extent that outside air enters the cabinet when a drawer is opened, the outside air is drawn toward the orifice 19 and hence is admixed with the air returning to the heating and humidifying system, the outside air being subjected to heating and humidification prior to being circulated through the cabinet. In this manner, the adverse effects of outside air on product in the cabinet are minimized.

In order to insure uniform discharge of the air through the various rows of perforations 42–45, it has been found desirable to provide a baffle 46 in the duct 21 between the third and fourth rows of perforations the baffle partially blocking the duct. This interruption of the downward flow of air causes increased air discharge through the first, second and third rows of perforations and also balances the quantity of air discharged through the fourth or lowermost row of perforations, thereby contributing to the efficiency of the system in maintaining uniform conditions in the cabinet.

In order to prevent the build-up of excessive heat in outer chamber 26 where the blower unit and controls are located, it is preferred to provide a separate fresh air fan 47 at the rear of one of the legs of the U-shaped outer chamber 26, the fan serving to circulate fresh air through outer chamber 26, the air being discharged from the rear of the opposite leg of the chamber through discharge orifice 48.

What is claimed is:
1. A heating and humidifying system for a holding cabinet having a product receiving compartment containing a plurality of product receptacles spaced one above the other, said system comprising a blower overlying said compartment and having an inlet side and an outlet side, an orifice in the top-front-center of said compartment in communication with the inlet side of said blower, an elongated heating tube connected at one end to the outlet side of said blower, heating means in said heating tube, temperature control means operatively connected to said heating means, a water reservoir lying beyond the opposite end of said heating tube, a plurality of heat transfer plates projecting upwardly from said reservoir and lying in the path of air discharged from said heating tube, means removably mounted said transfer plates in said reservoir, means for metering water into said reservoir, and duct means positioned to convey air flowing over said reservoir and around said transfer plates into said compartment from the rear thereof.

2. The heating and humidifying system claimed in claim 1 including drawers in said compartment having receptacle supporting frames, said product receptacles being removably supported in said frames.

3. The heating and humidifying system claimed in claim 2 wherein said product receptacles comprise wire baskets seated on said supporting frames.

4. The heating and humidifying system claimed in claim 2 wherein said product receptacles comprise trays having rolled upper edges, said supporting frames having peripheral flanges on which the rolled upper edges of the trays are supported.

5. The heating and humidifying system claimed in claim 4 wherein the bottoms of said trays are louvered.

6. The heating and humidifying system claimed in claim 1 wherein said transfer plates are of non-linear configuration and lie in uniformly spaced apart relation to each other.

7. The heating and humidifying system claimed in claim 6 wherein said heat transfer plates are formed from aluminum.

8. The heating and humidifying system claimed in claim 1 including a temperature probe operatively connected to said temperature control means, said probe being mounted between said orifice and the inlet side of said blower.

9. The heating and humidifying system claimed in claim 1 wherein said blower means is mounted in a first chamber overlying said product receiving compartment, and wherein said heating tube and said reservoir are contained in a second chamber also overlying said product receiving compartment, said chambers being sealed from each other, and said duct means being in communication with said second chamber.

10. The heating and humidifying system claimed in claim 9 wherein said first chamber is vented and includes fan means for circulating outside air through said second chamber.

11. The heating and humidifying system claimed in claim 10 wherein said temperature control means and the means for metering water into said reservoir are also located within said first chamber.

12. The heating and humidifying system claimed in claim 1 wherein said duct means includes a partition defining the inner rear wall of said product receiving compartment, said partitions having spaced apart rows of perforations therein in alignment with the undersurfaces of said product receptacles.

13. The heating and humidifying system claimed in claim 12 wherein said duct means includes baffle means to effectively balance the flow of air through said rows of perforations.

14. The heating and humidifying system claimed in claim 1 wherein said product receptacles comprise drawers, said drawers having front walls provided with sealing means acting to seal said product receiving compartment when said drawers are fully closed, whereby to form a closed loop heating and humidifying system.

* * * * *